(12) United States Patent
Park et al.

(10) Patent No.: US 9,733,617 B2
(45) Date of Patent: Aug. 15, 2017

(54) DISPLAY DEVICE AND OPERATING METHOD THEREOF

(71) Applicant: LG ELECTRONICS INC., Seoul (KR)

(72) Inventors: Woojae Park, Seoul (KR); Dowoo Kwon, Seoul (KR); Wonseok Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 279 days.

(21) Appl. No.: 13/961,929

(22) Filed: Aug. 8, 2013

(65) Prior Publication Data
US 2014/0218422 A1 Aug. 7, 2014

(30) Foreign Application Priority Data

Feb. 5, 2013 (KR) .................... 10-2013-0013062

(51) Int. Cl.
*G03H 1/26* (2006.01)
*G03H 1/22* (2006.01)
*G03H 1/28* (2006.01)
*G03H 1/04* (2006.01)

(52) U.S. Cl.
CPC ......... *G03H 1/2286* (2013.01); *G03H 1/2294* (2013.01); *G03H 1/28* (2013.01); *G03H 1/265* (2013.01); *G03H 2001/0439* (2013.01); *G03H 2223/14* (2013.01)

(58) Field of Classification Search
CPC ...... G03H 1/2286; G03H 1/2294; G03H 1/28; G03H 1/265; G03H 1/268; G03H 2223/14; G03H 2001/0439
See application file for complete search history.

(56) References Cited

U.S. PATENT DOCUMENTS

| | | | |
|---|---|---|---|
| 2006/0139710 A1* | 6/2006 | Schwerdtner | G03H 1/0808 359/9 |
| 2009/0219385 A1* | 9/2009 | Leister | G02B 27/2214 348/51 |
| 2013/0022222 A1* | 1/2013 | Zschau | G03H 1/0808 381/306 |
| 2013/0222384 A1* | 8/2013 | Futterer | G02B 5/32 345/426 |

* cited by examiner

*Primary Examiner* — Vijay Shankar
*Assistant Examiner* — Cory Almeida
(74) *Attorney, Agent, or Firm* — KED & Associates, LLP

(57) ABSTRACT

A display device according to embodiments of the present disclosure includes a determination unit to determine a display mode, a light generator to selectively irradiate a 2D light or a hologram 3D light, a spatial light modulator to selectively display a 2D image or a hologram 3D image, and a control unit that controls the light generator to selectively irradiate the 2D light or the hologram 3D light and controls the spatial light modulator to modulate the 2D light or the hologram 3D light irradiated from the light generator to display the 2D image or the hologram 3D image according to the display mode determined by the determination unit.

9 Claims, 8 Drawing Sheets

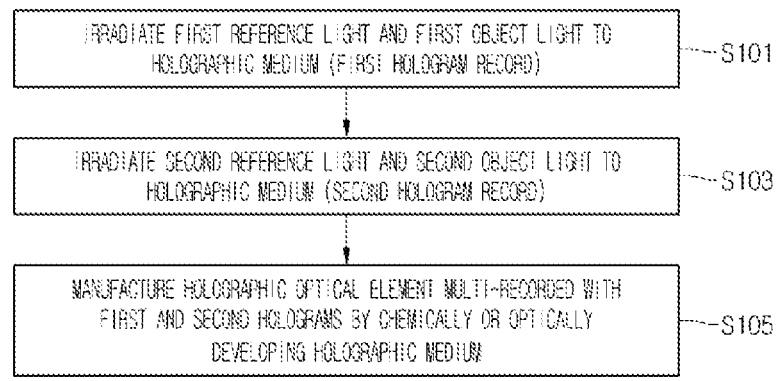
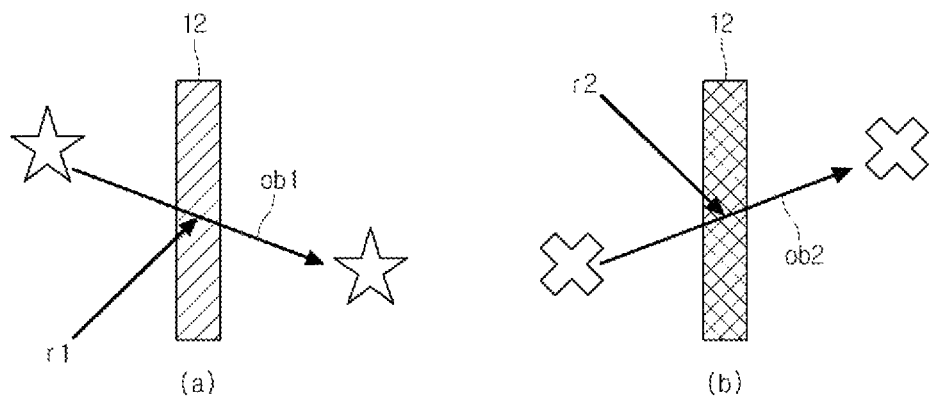
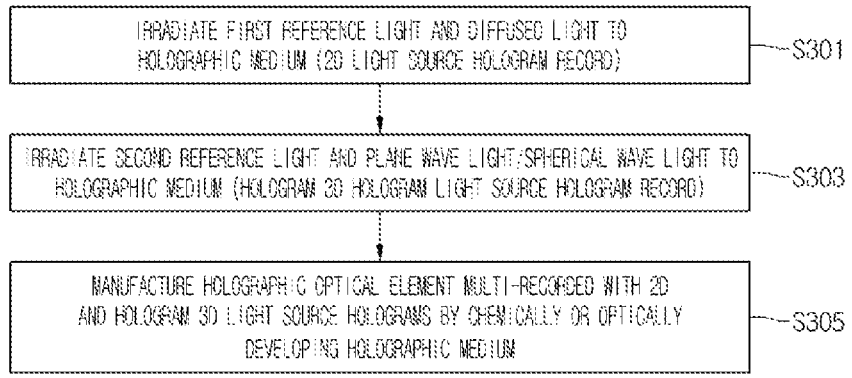

DISPLAY DEVICE AND OPERATING METHOD THEREOF

The present application claims priority under 35 U.S.C. 119 and 35 U.S.C. 365 to Korean Patent Application No. 10-2013-0013062 (Feb. 5, 2013), which is hereby incorporated by reference in its entirety.

BACKGROUND

The present disclosure relates to a display device capable of selectively displaying two-dimensional (2D) images or hologram three-dimensional (3D) images and an operating method thereof.

Recently, studies and research have been actively pursued on 3D display devices for displaying 3D images. The 3D images are more natural and realistic than the 2D images, so the demand for the 3D images has been gradually increased.

In order to reproduce the 3D images, a stereoscopy scheme, an auto-stereoscopy scheme, and a holography scheme have been extensively studied.

According to the stereoscopy scheme and the auto-stereoscopy scheme, a left-eye image and a right-image, which have the binocular parallax, are viewed to a left eye and a right eye of an observer, respectively, to cause the 3D effect. However, in a 3D display employing the above scheme, a binocular focus point is different from a focus adjustment point, so the observer's eyes may feel tired when the observer views the images. In particular, the auto-stereoscopy scheme may not implement the 2D images due to the structural problem thereof.

Meanwhile, according to the holography scheme, a light is modulated through the diffraction as the light is irradiated onto a holographic element so that object points are reproduced in a space by the modulated light. Thus, a 3D display device employing the holography scheme can provide the observer with hologram 3D images having the 3D effect without causing the observer's eyes to feel tired.

The above references are incorporated by reference herein where appropriate for appropriate teachings of additional or alternative details, features and/or technical background.

SUMMARY

The present disclosure provides a display device capable of selectively displaying 2D images or hologram 3D images by using one holographic element and an operating method thereof.

A display device according to an embodiment of the present disclosure includes a determination unit to determine a display mode, a light generator to selectively irradiate a 2D light or a hologram 3D light, a spatial light modulator to selectively display a 2D image or a hologram 3D image and a control unit that controls the light generator to selectively irradiate the 2D light or the hologram 3D light and controls the spatial light modulator to modulate the 2D light or the hologram 3D light irradiated from the light generator to display the 2D image or the hologram 3D image according to the display mode determined by the determination unit.

According to an embodiment of the present disclosure, there is provided a method of operating a display device including a light generator selectively irradiating a 2D light or a hologram 3D light, in which the method includes determining a display mode, selectively irradiating the 2D light or the hologram 3D light according to the display mode and selectively displaying a 2D image or a hologram 3D image by modulating the 2D light or the hologram 3D light.

According to the display device and the operating method of the display device of the present disclosure, the 2D images or hologram 3D images can be selectively displayed by using one holographic element.

BRIEF DESCRIPTION OF THE DRAWINGS

The embodiments will be described in detail with reference to the following drawings in which like reference numerals refer to like elements wherein:

FIG. 3 is a flowchart showing a method of manufacturing a holographic optical element related to an embodiment of the present disclosure.

FIG. 4 is a view showing a procedure for manufacturing a holographic optical element related to an embodiment of the present disclosure.

FIG. 5 is a flowchart showing a method of manufacturing a light source hologram unit according to an embodiment of the present disclosure.

DETAILED DESCRIPTION OF THE EMBODIMENTS

Hereinafter, embodiments of the present disclosure will be described in detail with reference to accompanying drawings.

A display device described in this specification may include a mobile phone, a tablet computer, a laptop computer, a PMP (portable multimedia player), a monitor or a TV. In addition, those skilled in the art may easily comprehend that the structure disclosed in the embodiments of the specification can be applied to various terminals that include a light modulation unit to selectively display a 2D image or a hologram 3D image by irradiating light into the light modulation unit.

Figure 1:
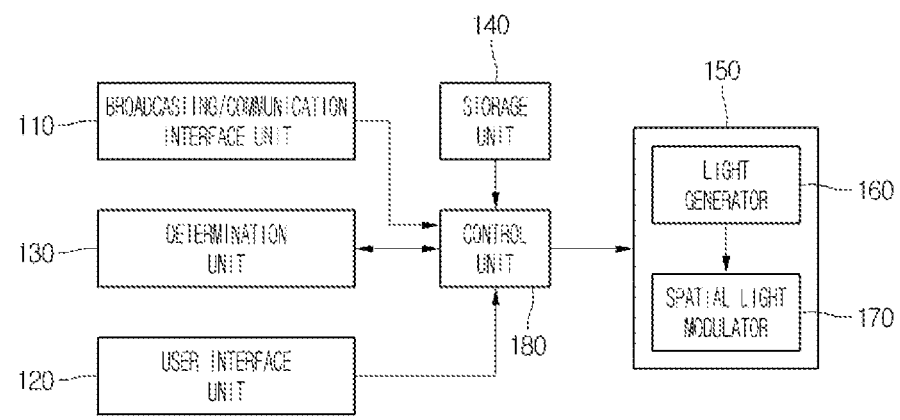
FIG. 1 is a block diagram showing a structure of a display device according to one embodiment of the present disclosure.

FIG. 1 is a block diagram showing a structure of a display device according to one embodiment of the present disclosure.

Referring to FIG. 1, the display device 100 according to one embodiment of the present disclosure includes a broadcasting/communication interface unit 110, a user interface unit 120, a determination unit 130, a storage unit 140, a display unit 150 and a control unit 180.

The broadcasting/communication interface unit 110 receives image signals including contents or additional information about the contents.

The additional information about the contents may include a title of the contents, a size of the contents and an identifier identifying the contents as the 2D image or the hologram 3D image.

The broadcasting/communication interface unit 110 may include a USB interface, a network interface, and an interface to receive broadcasting signals, but the disclosure is not limited thereto.

The user interface unit 120 receives a user's input.

The user interface unit 120 may be displayed on the display unit 150 in a predetermined formation. The predetermined formation may be a pop-up window, but the disclosure is not limited thereto.

The user interface unit 120 may receive the user's input that selects a display mode of the display device 100. The display mode may include a 2D mode and a hologram 3D mode.

The determination unit 130 determines the display mode.

The determination unit 130 may determine the display mode of the contents based on the additional information of the contents received in the broadcasting/communication interface unit 110. For instance, if the identifier identifying the contents as the 2D image is included in the additional information of the contents, the determination unit 130 determines the display mode of the contents as the 2D mode.

The determination unit 130 may determine the display mode of the contents based on the user's input received in the user interface unit 120. For instance, if the user interface unit 120 receives the user's input that selects the hologram 3D mode, the determination unit 130 determines the display mode of the contents as the hologram 3D mode.

The storage unit 140 may store the contents and additional information about the contents, such as an EPG (electronic program guide), an image supplied from a broadcasting program or an external device, an image list, and a restriction to access the hologram 3D image, as well as an application or a program supplied from the external device to reproduce the contents.

The display unit 150 displays the contents in the form of the 2D image or the hologram 3D image.

The contents may include broadcasting programs supplied from broadcasting stations, images supplied from the external device, and images stored in the storage unit 140 of the display device 100.

Hereinafter, elements of the display unit 150 will be described with reference to FIG. 2.

Figure 2:
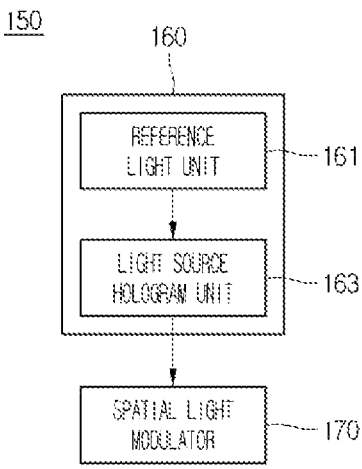
FIG. 2 is a block diagram showing a structure of a display unit according to one embodiment of the present disclosure.

FIG. 2 is a block diagram showing a structure of the display unit 150 according to one embodiment of the present disclosure.

The display unit 150 includes a light generator 160 and a spatial light modulator 170.

The light generator 160 can selectively irradiate 2D light or hologram 3D light. The light generator 160 includes a reference light unit 161 and a light source hologram unit 163.

The reference light unit 161 selectively irradiates 2D reference light or the hologram 3D reference light. In detail, the reference light unit 161 can selectively irradiate one of the 2D reference light and the hologram 3D reference light based on the control signal transmitted thereto from the control unit 180.

The light source hologram unit 163 may include a holographic optical element or a spatial light modulator.

The holographic optical element included in the light source hologram unit 163 may be prepared by using a holographic medium, such as a photopolymer capable of multiplexing a hologram, a photo refractive crystal including lithium niobate ($LiNbO_3$) or a silver-halide. The holographic optical element included in the light source hologram unit 163 may be replaced with the spatial light modulator capable of displaying at least one hologram.

The spatial light modulator included in the light source hologram unit 163 may include an LCD (liquid crystal display), a PDP (plasma display panel), a DMD (digital micromirror device) or an AOM (acousto-optic modulator). Such a spatial light modulator included in the light source hologram unit 163 can display a CGH (computer generated hologram) according to the electronic hologram scheme.

A light source hologram recorded in the light source hologram unit 163 may include a 2D light source hologram and a hologram 3D light source hologram.

The 2D reference light irradiated from the reference light unit 161 is diffracted by the 2D light source hologram recorded in the light source hologram unit 163 so as to be modulated into the 2D light. For instance, the 2D light may be a diffused light.

In addition, the hologram 3D reference light irradiated from the reference light unit 161 is diffracted by the hologram 3D light source hologram recorded in the light source hologram unit 163 so as to be modulated into the hologram 3D light. For instance, the hologram 3D light may be a plane wave light or a spherical wave light.

The spatial light modulator 170 modulates the light irradiated from the light generator 160 to output the 2D image or the hologram 3D image.

Referring again to FIG. 1, the control unit 180 controls the overall operation of the display device 100.

In detail, when the display mode of the display device 100 is the 2D mode, the control unit 180 sets the light generator 160 as the 2D light source. In addition, when the display mode of the display device 100 is the hologram 3D mode, the control unit 180 sets the light generator 160 as the hologram 3D light source.

The control unit 180 transmits the additional information about the contents received in the broadcasting/communication interface unit 110 and the user's input received in the user interface unit 120 to select the 2D mode or the hologram 3D mode to the determination unit 130 and controls the display unit 150 based on information about the display mode transmitted from the determination unit 130.

Further, the control unit 180 may directly determine the display mode based on the additional information about the contents and the user's input that selects the display mode, but the present disclosure is not limited thereto.

If the display mode is the 2D mode, the control unit 180 may control the reference light unit 161 to irradiate the 2D reference light.

If the display mode is the hologram 3D mode, the control unit 180 may control the reference light unit 161 to irradiate the hologram 3D reference light.

Hereinafter, the manufacture principle of the holographic optical element related to the embodiment of the present disclosure will be described with reference to FIGS. 3 and 4.

FIG. 3 is a flowchart showing a method of manufacturing the holographic optical element related to the embodiment of the present disclosure.

Referring to FIG. 3, if a first reference light and a first object light are simultaneously irradiated onto a holographic medium (S101), a first hologram may be recorded in the holographic medium.

The first hologram may refer to interference fringes recorded in the holographic medium by the first reference light and the first object light. Hereinafter, the holographic medium recorded with the first hologram will be described with reference to FIG. 4(a).

FIG. 4 is a view showing a procedure for manufacturing the holographic optical element related to the embodiment of the present disclosure.

Referring to FIG. 4(a), if the first reference light r1 and the first object light ob1 are simultaneously irradiated onto the holographic medium 12, the first hologram is recorded in the holographic medium 12 as illustrated by first diagonal lines. The diagonal lines are one example of the hologram recorded in the holographic medium 12, and the hologram may be presented in various shapes in addition to the diagonal lines.

Referring again to FIG. 3, if a second reference light and a second object light are simultaneously irradiated onto the holographic medium 12 multi-recorded with the first hologram (S103), a second hologram may be recorded in the holographic medium 12.

The second hologram may refer to interference fringes recorded in the holographic medium 12 by the second reference light and the second object light. Hereinafter, the holographic medium 12 recorded with the first and second holograms will be described with reference to FIG. 4(b).

Referring to FIG. 4(b), if the second reference light r2 and the second object light ob2 are simultaneously irradiated onto the holographic medium 12, the second hologram different from the first hologram is recorded in the holographic medium 12 as illustrated by second diagonal lines. As a result, a multiplexed hologram is recorded in the holographic medium 12.

Referring again to FIG. 3, the holographic medium 12 recorded with the multiplexed hologram is chemically or optically developed to manufacture the holographic optical element multi-recorded with the first and second holograms (S105).

The chemical development may refer to a process of developing the holographic medium recorded with the hologram by using a developer. In addition, the optical development may refer to a process of developing the holographic medium recorded with the hologram by using an ultraviolet light.

If the holographic medium 12 multi-recorded with the first and second holograms is chemically or optically developed, the holographic optical element, which is not deformed any more even if the light is irradiated thereto, can be manufactured.

Hereinafter, the method of manufacturing the light source hologram unit according to one embodiment of the present disclosure will be described with reference to FIGS. 5 and 6. The manufacture principle described above with reference to FIGS. 3 and 4 may be applied to the method of manufacturing the light source hologram unit according to one embodiment of the present disclosure. In addition, the method of manufacturing the light source hologram unit described with reference to FIGS. 5 and 6 may be applicable when manufacturing the holographic optical element included in the light source hologram unit 163.

FIG. 5 is a flowchart showing the method of manufacturing the light source hologram unit according to an embodiment of the present disclosure.

Referring to FIG. 5, if a first reference light and a diffused light are simultaneously irradiated onto a holographic medium (S301), a 2D light source hologram may be recorded in the holographic medium.

The 2D light source hologram may refer to interference fringes recorded in the holographic medium by the first reference light and the diffused light. Hereinafter, the holographic medium recorded with the 2D light source hologram will be described with reference to FIG. 6(a).

Figure 6:
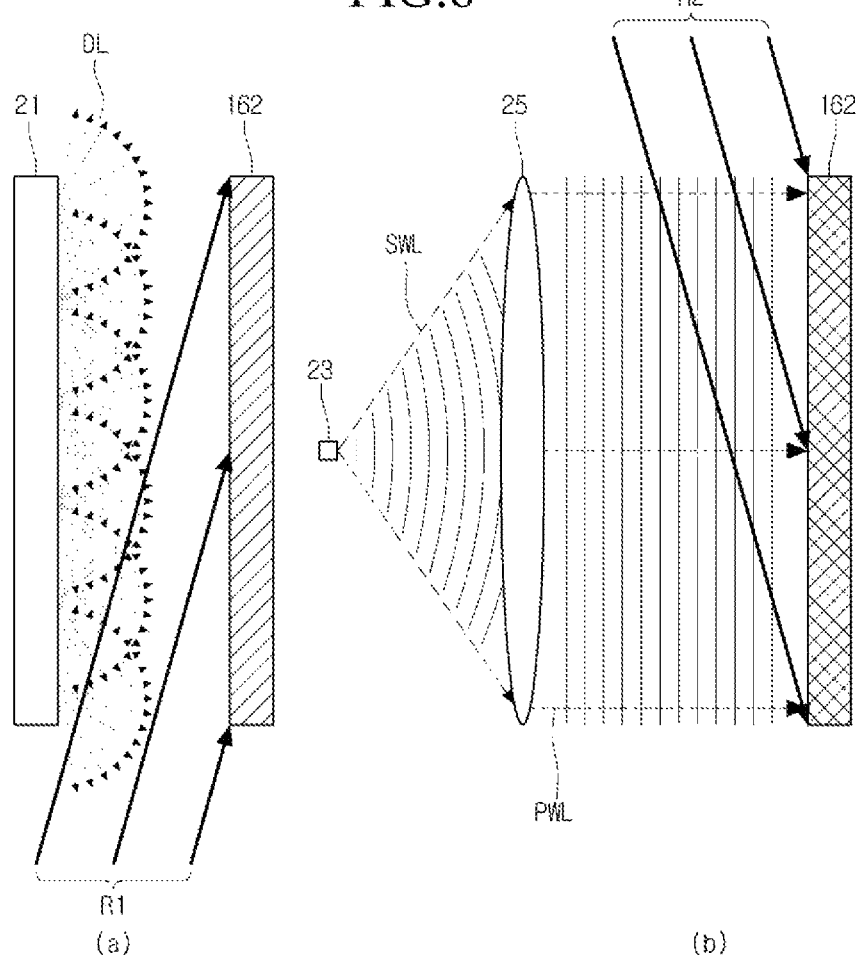
FIG. 6 is a view showing a procedure for manufacturing a light source hologram unit according to an embodiment of the present disclosure.

FIG. 6 is a view showing a procedure for manufacturing the light source hologram unit according to an embodiment of the present disclosure.

Referring to FIG. 6(a), if the first reference light R1 and the diffused light DL are simultaneously irradiated onto the holographic medium 162, the 2D light source hologram is recorded in the holographic medium 162 as illustrated by first diagonal lines.

The 2D light source hologram may refer to the hologram to generate the 2D light.

The diffused light DL may be irradiated from a BLU (backlight unit) 21 for a general 2D display device.

Referring again to FIG. 5, if a second reference light and a plane wave light are simultaneously irradiated onto the holographic medium recorded with the 2D light source hologram (S303), the hologram 3D light source hologram may be recorded in the holographic medium. In addition, if a second reference light and a spherical wave light are simultaneously irradiated onto the holographic medium recorded with the 2D light source hologram (S303), the hologram 3D light source hologram may be recorded in the holographic medium.

The hologram 3D light source hologram may refer to interference fringes recorded in the holographic medium by the second reference light and the plane wave light. Hereinafter, the holographic medium multi-recorded with the 2D light source hologram and the hologram 3D light source hologram will be described with reference to FIG. 6(b).

Referring to FIG. 6(b), if the second reference light R2 and the plane wave light PWL are simultaneously irradiated onto the holographic medium 162 recorded with the 2D light source hologram, the hologram 3D light source hologram, which is illustrated by second diagonal lines different from the first diagonal lines, is recorded in the holographic medium 162. As a result, the 2D light source hologram and the hologram 3D light source hologram are recorded in the holographic medium 162.

The hologram 3D light source hologram may refer to the hologram to generate the hologram 3D light.

A light source 23 shown in FIG. 6(b) may irradiate a spherical wave light (SWL).

If the SWL irradiated from the light source 23 passes through a lens 25, the SWL may be converted into the PWL, and the present disclosure does not limit the method of generating the PWL.

Referring again to FIG. 5, the holographic medium 162 recorded with the multiplexed hologram is chemically or optically developed to manufacture the holographic optical element multi-recorded with the 2D hologram and the hologram 3D hologram (S305). The holographic optical element multi-recorded with the 2D hologram and the hologram 3D hologram may be included in the light source hologram unit 163 described above.

Hereinafter, the hologram recovery principle related to the embodiment of the present disclosure will be described with reference to FIGS. 7 and 8. The holographic optical element shown in FIGS. 7 and 8 may be equal to the holographic optical element shown in FIGS. 3 and 4.

Figure 7:
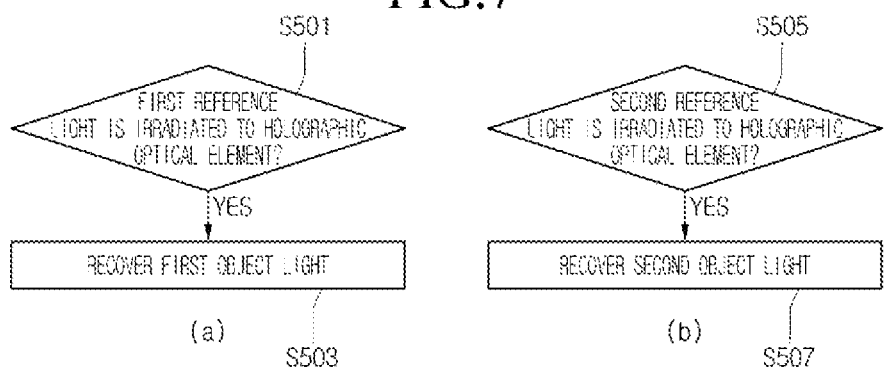
FIG. 7 is a flowchart showing a hologram recovery method of a holographic optical element related to an embodiment of the present disclosure.

FIG. 7 is a flowchart showing a hologram recovery method of the holographic optical element related to the embodiment of the present disclosure.

Referring to FIG. 7(*a*), if a first reference light is irradiated onto the holographic optical element recorded with the multiplexed hologram (S501), the holographic optical element recovers the first object light in a space (S503). The holographic optical element capable of recovering the first object light will be described with reference to FIG. 8(*a*).

Figure 8:
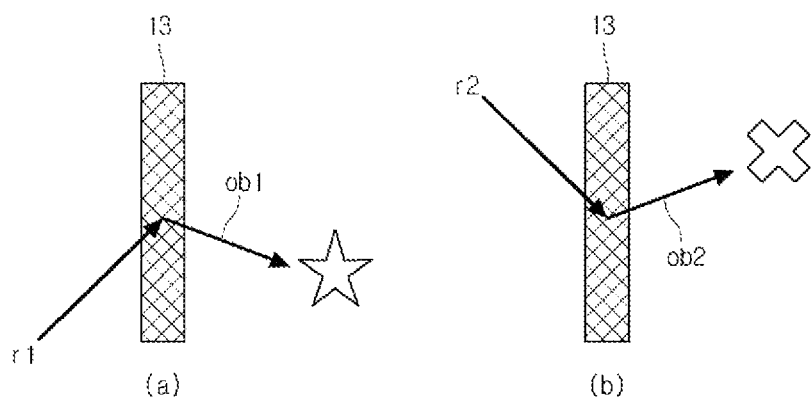
FIG. 8 is a view showing a hologram recovery procedure of a holographic optical element related to an embodiment of the present disclosure.

FIG. 8 is a view showing a hologram recovery procedure of the holographic optical element related to the embodiment of the present disclosure.

Referring to FIG. 8(*a*), if a light source (not shown) irradiates a first reference light r1 toward a holographic optical element 13 recorded with first and second holograms, a first object light ob1 is recovered in the space, but a second object light ob2 is not recovered.

Referring again to FIG. 7, as shown in FIG. 7(*b*), if a second reference light is irradiated onto the holographic optical element recorded with the multiplexed hologram (S505), the holographic optical element recovers the second object light in the space (S507). The holographic optical element capable of recovering the second object light will be described with reference to FIG. 8(*b*).

Referring to FIG. 8(*b*), if a light source (not shown) irradiates a second reference light r2 toward the holographic optical element 13 recorded with first and second holograms, the first object light ob2 is recovered in the space, but the first object light ob1 is not recovered.

In this manner, the holographic optical element recorded with the multiplexed hologram can be manufactured. When the reference light used for the hologram record is irradiated, the holographic optical element recorded with the multiplexed hologram can recover the object light corresponding to the irradiated reference light according to the Bragg matching condition.

Hereinafter, the method of displaying the 2D image or the hologram 3D image according to one embodiment of the present disclosure will be described with reference to FIGS. 9 to 14. The hologram recovery principle described above with reference to FIGS. 7 and 8 may be applied to the method of displaying the 2D image or the hologram 3D image according to one embodiment of the present disclosure.

Figure 10:
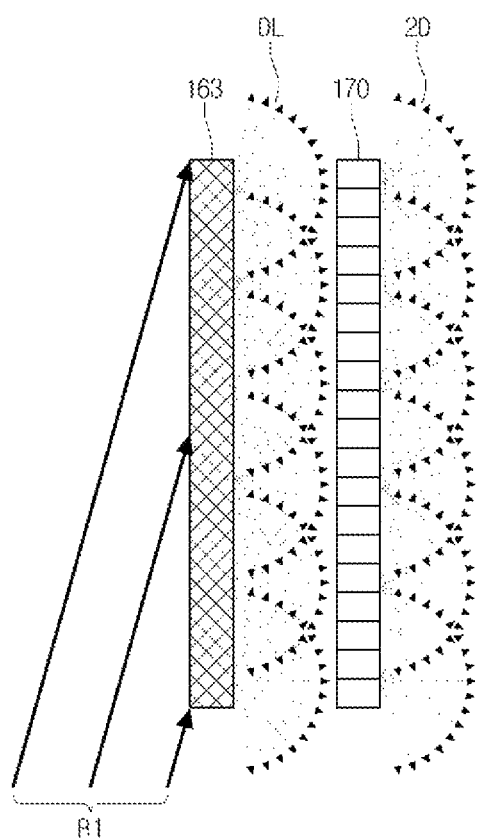
FIG. 10 is a view showing a procedure for displaying a 2D image of a display device according to an embodiment of the present disclosure.
Figure 12:
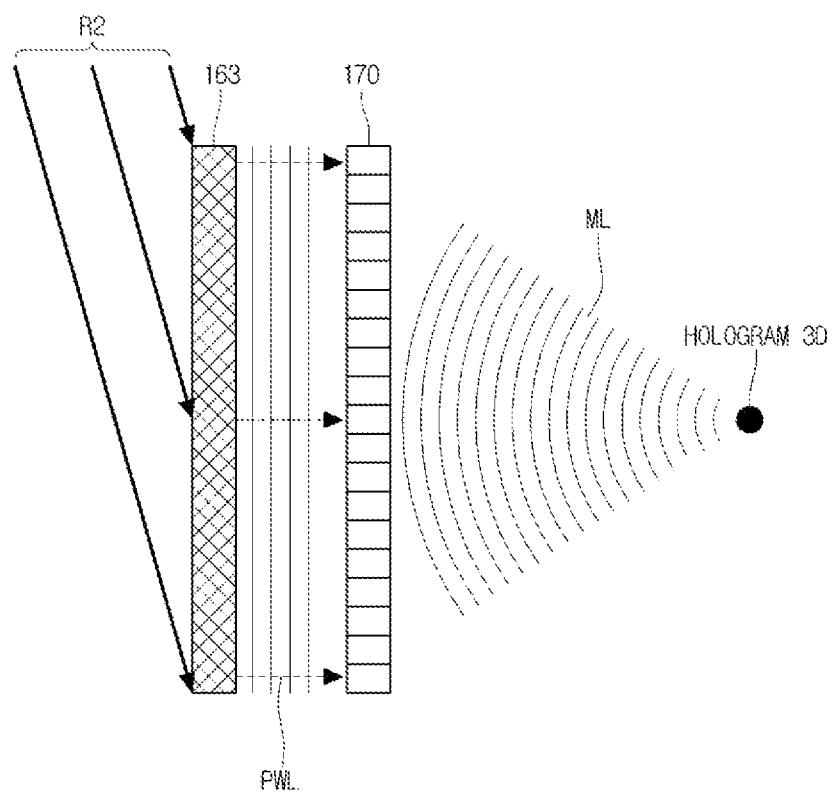
FIG. 12 is a view showing a procedure for displaying a hologram 3D image of a display device according to an embodiment of the present disclosure.

The light source hologram unit 163 shown in FIGS. 10 and 12 may be a light source hologram unit, which is manufactured by chemically or optically developing the holographic medium 162 multi-recorded with the 2D light source hologram and the hologram 3D light source hologram shown in FIGS. 5 and 6.

Figure 9:
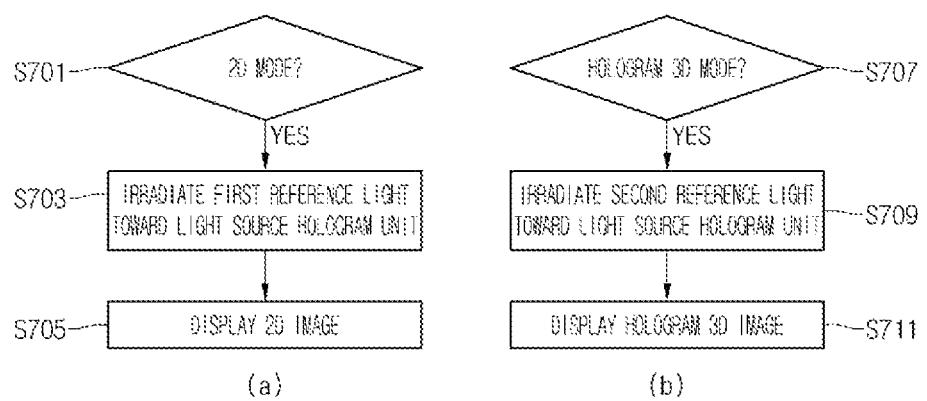
FIG. 9 is a flowchart showing a method of displaying a 2D image or a hologram 3D image of a display device according to an embodiment of the present disclosure.

FIG. 9 is a flowchart showing a method of displaying the 2D image or the hologram 3D image of a display device according to the embodiment of the present disclosure.

Referring to FIG. 9(*a*), the determination unit 130 determines the current display mode (S701). As described above, the current display mode can be set based on the additional information about the contents and the user's input.

If it is determined by the determination unit 130 that the current display mode is the 2D mode, the reference light unit 161 irradiates the first reference light to the light source hologram unit 163 under the control of the control unit 180 (S703). As the reference light unit 161 irradiates the first reference light, the light generator 160 serves as the 2D light source.

Then, if the light generator 160 serving as the 2D light source irradiates the 2D light, the display unit 150 displays the 2D image (S705). Hereinafter, the 2D image display of the display unit 150 according to the irradiation of the first reference light will be described with reference to FIG. 10.

FIG. 10 is a view showing a procedure for displaying the 2D image of the display device according to the embodiment of the present disclosure.

Referring to FIG. 10, if a reference light unit (not shown) irradiates the first reference light R1 toward the light source hologram unit 163 under the control of the control unit 180, the light source hologram unit 163 recovers the 2D light, such as the diffused light DL. At this time, the light source hologram unit 163, onto which the first reference light R1 is irradiated, recovers only the 2D light without recovering the hologram 3D light.

As the 2D light, such as the diffused light DL, is irradiated toward the spatial light modulator 170, the 2D image 2D is displayed over the spatial light modulator 170. Hereinafter, a viewing angle provided when the display device 100 displays the 2D image will be described with reference to FIG. 11.

Figure 11:
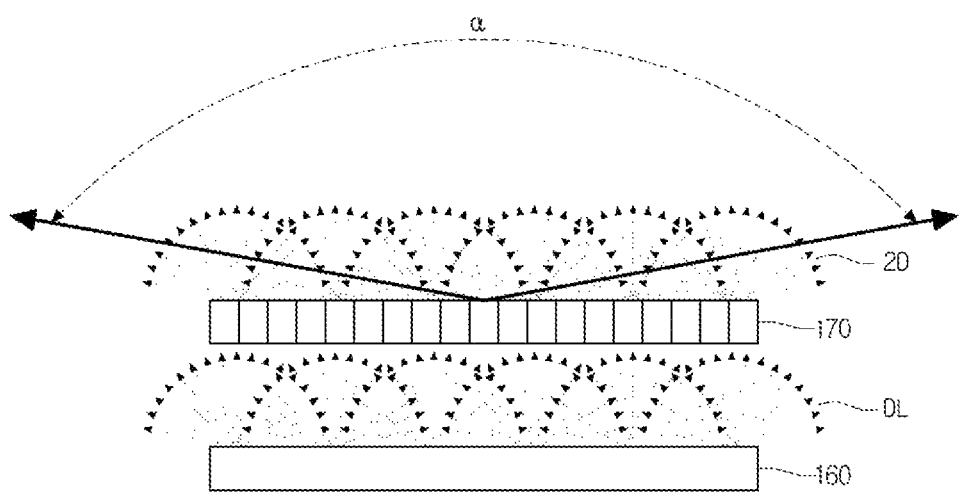
FIG. 11 is a view to explain a viewing angle provided when a display device according to one embodiment of the present disclosure displays a 2D image.

FIG. 11 is a view to explain the viewing angle provided when the display device according to the embodiment of the present disclosure displays the 2D image.

Referring to FIG. 11, if the diffused light DL irradiated from the light generator 160 passes through the spatial light modulator 170, the diffused light DL is modulated at all pixels constituting the spatial light modulator 170 due to the property of the diffused light DL, so the viewing angle ($\alpha$) of the modulated diffused light DL may approximate to 180°.

Referring again to FIG. 9, as shown in FIG. 9(*b*), if it is determined by the determination unit 130 that the current display mode is the hologram 3D mode (S707), the reference light unit 161 irradiates the second reference light to the light source hologram unit 163 under the control of the control unit 180 (S709). As the reference light unit 161 irradiates the second reference light, the light generator 160 serves as the hologram 3D light source.

Then, if the light generator 160 serving as the hologram 3D light source irradiates the hologram 3D light, the display unit 150 displays the hologram 3D image (S711). Hereinafter, the hologram 3D image display of the display unit 150 according to the irradiation of the second reference light will be described with reference to FIGS. 12 and 13.

FIG. 12 is a view showing a procedure for displaying the hologram 3D image of the display device according to the embodiment of the present disclosure.

Referring to FIG. 12, if a reference light unit (not shown) irradiates the second reference light R2 toward the light source hologram unit 163 under the control of the control unit 180, the light source hologram unit 163 recovers the hologram 3D light, such as the plane wave light (PWL). At this time, the light source hologram unit 163, onto which the second reference light R2 is irradiated, recovers only the hologram 3D light without recovering the 2D light.

Then, as the hologram 3D light, such as the plane wave light (PWL), is irradiated toward the spatial light modulator 170, a modulated light ML, which has been modulated in the spatial light modulator 170, recovers the hologram 3D image (hologram 3D) in the space. The modulated light ML can be obtained by diffracting the light on the hologram, such as a CGH (computer generated hologram) displayed in the spatial light modulator 170.

Figure 13:
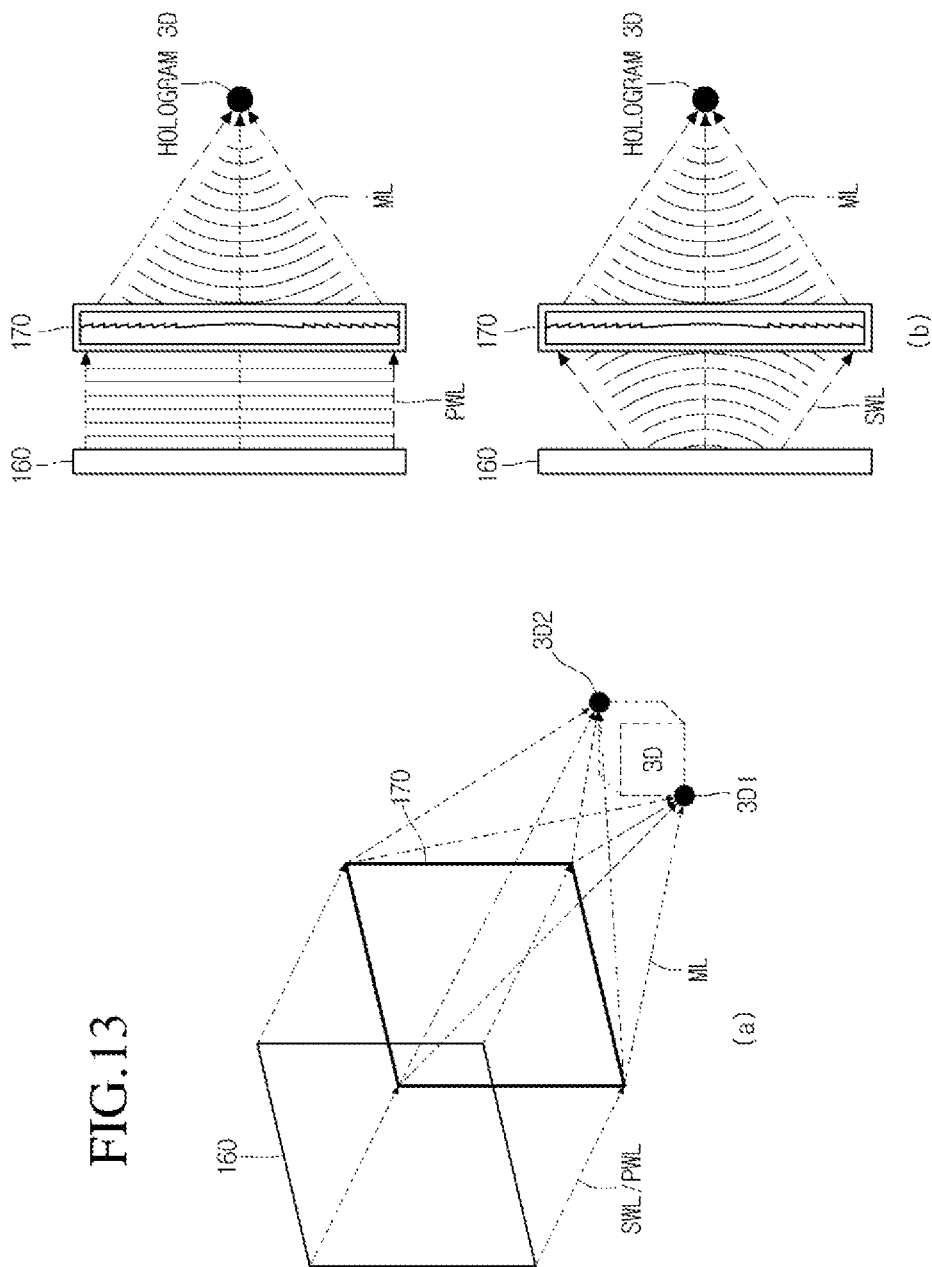
FIG. 13 is a view showing a procedure for displaying a hologram 3D image of a display device according to another embodiment of the present disclosure.

FIG. 13 is a view showing a procedure for displaying the hologram 3D image of the display device according to another embodiment of the present disclosure.

Referring to FIG. 13(a), the light generator 160 irradiates the hologram 3D light, such as the plane wave light PWL or the spherical wave light SWL, under the control of the control unit 180. The spatial light modulator 170 modulates the hologram 3D light to recover a first object point 3D1 and a second object point 3D2 in the space. The first object point 3D1 and the second object point 3D2 may constitute the hologram 3D image.

FIG. 13(b) shows the plane wave light PWL and the spherical wave light SWL irradiated from the light generator 160 to the spatial light modulator 170 in such a way that the plane wave light PWL can be discriminated from the spherical wave light SWL. FIG. 13(b) is a plan view of FIG. 13(a).

Hereinafter, the viewing angle provided when the display device 100 displays the hologram 3D image will be described with reference to FIG. 14.

Figure 14:
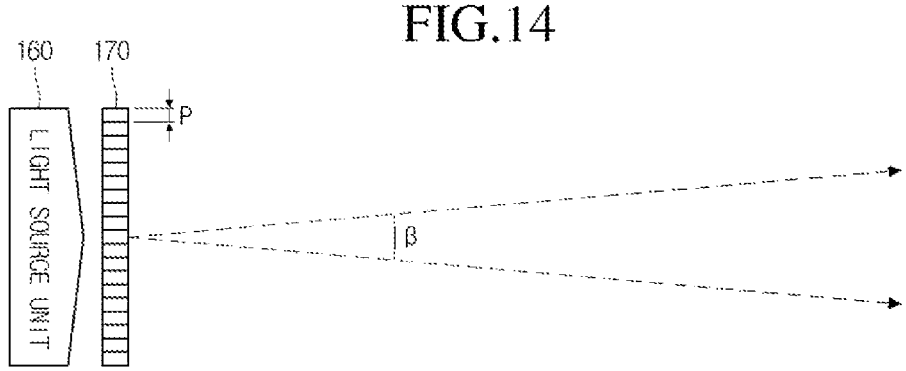
FIG. 14 is a view to explain a viewing angle provided when a display device according to one embodiment of the present disclosure displays a hologram 3D image.

FIG. 14 is a view to explain the viewing angle provided when the display device according to one embodiment of the present disclosure displays the hologram 3D image.

Referring to FIG. 14, if the hologram 3D light irradiated from the light generator 160 passes through the spatial light modulator 170, the viewing angle ($\beta$) of the modulated light can be determined according to the wavelength ($\lambda$) of the hologram 3D light and the pixel pitch (p) of the spatial light modulator 170. For instance, the viewing angle ($\beta$) provided when the display device displays the hologram 3D image can be calculated according to the following equation.

$$\beta = 2\tan^{-1}\frac{\lambda}{2p}$$ [Equation]

In this manner, the viewing angle ($\beta$) provided when the display device displays the hologram 3D image may be limited according to the wavelength of the light irradiated from the light generator 160 and the pitch of the pixel of the spatial light modulator 170.

Therefore, the display device 100 according to the embodiment of the present disclosure can selectively display the 2D image or the hologram 3D image by using one light source holographic element recorded or marked with the multiplexed hologram.

Further, as described above, although various examples have been illustrated and described, the present disclosure is not limited to the above-mentioned examples and various modifications can be made by those skilled in the art without departing from the scope of the appended claims. In addition, these modified examples should not be appreciated separately from technical spirits or prospects.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a light generator, wherein the light generator includes a light source hologram unit multi-recorded with a 2D light source hologram and a hologram 3D light source hologram, wherein the light source hologram unit is manufactured by developing a holographic medium, wherein the light generator includes a reference light unit to irradiate a first reference light and a second reference light, wherein the 2D light source hologram is recorded by simultaneously irradiating a 2D light and the first reference light onto the holographic medium and the hologram 3D light source hologram is recorded by simultaneously irradiating a hologram 3D light and the second reference light onto the holographic medium, wherein the 2D light and the hologram 3D light are irradiated onto a same area of the holographic medium;
a spatial light modulator that displays a 2D image or a hologram 3D image;
a determination unit that determines a display mode; and
a controller, wherein the controller controls the reference light unit to irradiate the first reference light onto the light source hologram unit such that the 2D light is generated from the light source hologram unit and controls the spatial light modulator to display the 2D image by using the generated 2D light when the display mode is a 2D mode, and wherein the controller controls the reference light unit to irradiate the second reference light onto the light source hologram unit such that the hologram 3D light is generated from the light source hologram unit and controls the spatial light modulator to display the hologram 3D image by using the generated hologram 3D light when the display mode is a hologram 3D mode,
wherein the first reference light is diffracted by the 2D light source hologram and modulated into the 2D light, when the display mode is the 2D mode,
wherein the second reference light is diffracted by the hologram 3D light source hologram and modulated into the hologram 3D light, when the display mode is the hologram 3D mode,
wherein the first reference light and the second reference light are irradiated onto a same area of the light source hologram unit,
wherein the generated 2D light is a diffused light and the generated hologram 3D light is a plane wave light or a spherical wave light, and
wherein the spatial light modulator displays the 2D image over the spatial light modulator by modulating the diffused light and displays the hologram 3D image in a space by modulating the plane wave light or a spherical wave light.

2. The display device of claim 1, wherein the light source hologram unit includes a holographic optical element multi-recorded with the 2D light source hologram and the hologram 3D light source hologram.

3. The display device of claim 1, wherein the light source hologram unit includes a spatial light modulator to display the 2D light source hologram or the hologram 3D light source hologram using a computer generated hologram scheme.

4. The display device of claim 1, wherein the determination unit determines the display mode according to at least one of a user's input or a type of a received image signal.

5. A method of operating a display device including a light generator, the method comprising:
  recording a 2D light source hologram by simultaneously irradiating a 2D light and a first reference light onto a holographic medium and recording a hologram 3D light source hologram by simultaneously irradiating a hologram 3D light and a second reference light onto the holographic medium, wherein the light generator includes the light source hologram unit multi-recorded with a 2D light source hologram and a hologram 3D light source hologram, wherein the light source hologram unit is manufactured by developing the holographic medium, wherein the 2D light and the hologram 3D light are irradiated onto a same area of the holographic medium, wherein the light generator includes a spatial light modulator;
  determining a display mode;
  irradiating the first reference light onto the light source hologram unit such that the 2D light is generated from the light source hologram unit when the display mode is a 2D mode, and irradiating the second reference light onto the light source hologram unit such that the hologram 3D light is generated from the light source hologram unit when the display mode is a hologram 3D mode; and
  displaying a 2D image by using the generated 2D light in accordance with the 2D light being generated and displaying a hologram 3D image by using the hologram 3D in accordance with the hologram 3D light being,
  wherein the first reference light is diffracted by the 2D light source hologram and modulated into the 2D light, when the display mode is the 2D mode,
  wherein the second reference light is diffracted by the hologram 3D light source hologram and modulated into the hologram 3D light, when the display mode is the hologram 3D mode,
  wherein the first reference light and the second reference light are irradiated onto a same area of the light source hologram unit,
  wherein the generated 2D light is a diffused light and the generated hologram 3D light is a plane wave light or a spherical wave light, and
  wherein the spatial light modulator displays the 2D image over the spatial light modulator by modulating the diffused light and displays the hologram 3D image in a space by modulating the plane wave light or a spherical wave light.

6. The method of claim 5, wherein the display mode is determined according to at least one of a user's input or a type of a received image signal.

7. The method of claim 5, wherein the light source hologram unit includes a holographic optical element multi-recorded with the 2D light source hologram and the hologram 3D light source hologram.

8. The method of claim 7, further including:
  irradiating the first reference light to the holographic optical element when the display mode is a 2D mode, and irradiating the second reference light to the holographic optical element when the display mode is the hologram 3D mode, wherein the first reference light and the second reference light are irradiated onto a same area of the holographic optical element.

9. The method of claim 8, wherein the spatial light modulator displays the 2D light source hologram or the hologram 3D light source hologram using a computer generated hologram scheme, wherein the irradiating the first reference light when the display mode is a 2D mode includes irradiating the first reference light to the spatial light modulator, and wherein irradiating the second reference light when the display mode is the hologram 3D mode includes irradiating the second reference light to the spatial light modulator.

* * * * *